United States Patent
Volny et al.

(10) Patent No.: US 11,192,656 B2
(45) Date of Patent: Dec. 7, 2021

(54) DUAL PURPOSE LIFE PRESERVER AND INFLATABLE HEAD RESTRAINT FOR PARACHUTE ASSEMBLIES

(71) Applicant: GOODRICH CORPORATION, Charlotte, NC (US)

(72) Inventors: Jaro S. Volny, Scottsdale, AZ (US); Kassidy L. Carson, Colorado Springs, CO (US)

(73) Assignee: Goodrich Corporation, Charlotte, NC (US)

( * ) Notice: Subject to any disclaimer, the term of this patent is extended or adjusted under 35 U.S.C. 154(b) by 253 days.

(21) Appl. No.: 16/369,346

(22) Filed: Mar. 29, 2019

(65) Prior Publication Data
US 2020/0307810 A1 Oct. 1, 2020

(51) Int. Cl.
*B64D 25/04* (2006.01)
*B64D 17/22* (2006.01)
*B64D 25/18* (2006.01)
*B64D 25/10* (2006.01)

(52) U.S. Cl.
CPC ............ *B64D 25/04* (2013.01); *B64D 17/22* (2013.01); *B64D 25/10* (2013.01); *B64D 25/18* (2013.01)

(58) Field of Classification Search
CPC ........ B64D 25/02; B64D 25/04; B64D 25/10; B64D 25/14; B64D 17/30; B64D 2201/00
See application file for complete search history.

(56) References Cited

U.S. PATENT DOCUMENTS

| | | |
|---|---|---|
| 5,301,903 A | 4/1994 | Aronne |
| 6,296,204 B1 | 10/2001 | Lewis et al. |
| 6,422,513 B1 * | 7/2002 | Lewis .................... B64D 25/02 2/413 |
| 6,857,136 B1 * | 2/2005 | Bradley ............. A41D 13/0125 2/102 |
| 2013/0092796 A1 * | 4/2013 | Weinel ...................... A45F 3/10 244/149 |
| 2020/0094973 A1 * | 3/2020 | Volny .................... B64D 25/10 |

* cited by examiner

*Primary Examiner* — Richard G Davis
(74) *Attorney, Agent, or Firm* — Snell & Wilmer L.L.P.

(57) ABSTRACT

A life preserver head restraint may be configured to inflate in response to deployment of a parachute assembly. The life preserver head restraint may comprise an inflatable volume and a charge tank fluidly coupled to the inflatable volume. In an inflated state, the life preserver head restraint may restrict head movement during line stretch of the parachute assembly.

7 Claims, 6 Drawing Sheets

DUAL PURPOSE LIFE PRESERVER AND INFLATABLE HEAD RESTRAINT FOR PARACHUTE ASSEMBLIES

FIELD

The present disclosure relates to parachute assemblies, and more specifically, to parachute assemblies having an inflatable life preserver head restraint.

BACKGROUND

Ejection seats are designed to eject pilots from an aircraft, with the pilot oriented in an generally upright, sitting position. Conventionally, the pilot is released from the ejection seat in response to a main canopy of the ejection seat's parachute assembly deploying. As the canopy catches wind, the pilot may be rotated to orient the pilot in the direction of canopy line stretch. As the pilot is rotated in-line with the force provided by the canopy, there is an increased risk of neck hyperextension and injury due to the pilot's head being forced rearward by the change in angular momentum.

SUMMARY

A life preserver head restraint configured to inflate in response to a deployment of a parachute assembly is disclosed herein. In accordance with various embodiments, the life preserver head restraint may comprise an inflatable volume and a charge tank fluidly coupled to the inflatable volume. A valve of the charge tank may be configured to translate to an open position in response to the deployment of the parachute assembly.

In various embodiments, a flight suit may be coupled to the life preserver head restraint. In various embodiments, the inflatable volume may comprise a U-shape.

In various embodiments, a lanyard may be coupled between the charge tank and the parachute assembly. In various embodiments, the deployment of the parachute assembly may be configured to translate the lanyard. In various embodiments, the lanyard may be coupled to the valve of the charge tank, and translation of lanyard may be configured to actuate the valve to the open position.

In various embodiments, in an inflated state, the life preserver head restraint may restrict head movement during suspension line stretch of the parachute assembly.

An ejection seat is also disclosed herein. In accordance with various embodiments, the ejection seat may comprise a head restraint system configured to deploy in response initiation of an ejection sequence, and a life preserver head restraint coupled to the head restraint system. The life preserver head restraint may be configured to inflate in response to a translation of the head restraint system.

In various embodiments, the head restraint system may comprise a rear support and a side support. The rear support and the side support may be configured to pivot relative to a seat back of the ejection seat.

In various embodiments, a charge tank may be fluidly coupled to the life preserver head restraint. A lanyard may be configured to actuate a valve of the charge tank to an open position. In various embodiments, the lanyard may actuate the valve to the open position in response to the head restraint system translating to a deployed position.

In various embodiments, the lanyard may actuate the valve to the open position in response to the head restraint system translating from a deployed position to a stowed position.

In various embodiments, a parachute assembly may be operationally coupled to the head restraint system. The head restraint system may be configured to translate from the deployed position to the stowed position in response to a deployment of the parachute assembly. In various embodiments, the lanyard may be coupled to the parachute assembly. The deployment of the parachute assembly may translate the lanyard.

A parachute assembly is also disclosed herein. In accordance with various embodiments, the parachute assembly may comprise a canopy, a plurality of suspension lines coupled to the canopy, a riser located at an end of the plurality of suspension lines opposite the canopy, and a life preserver head restraint configured to inflate in response to an increase in tension in the riser.

In various embodiments, a charge tank may be fluidly coupled to the life preserver head restraint. In various embodiments, a lanyard may be coupled between the charge tank and the riser.

In various embodiments, the increase in tension in the riser may be configured to translate the lanyard. In various embodiments, the lanyard is coupled to a valve of the charge tank. Translation of the lanyard may be configured to actuate the valve to an open position. In various embodiments, the life preserver head restraint may be attached to a flight suit.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
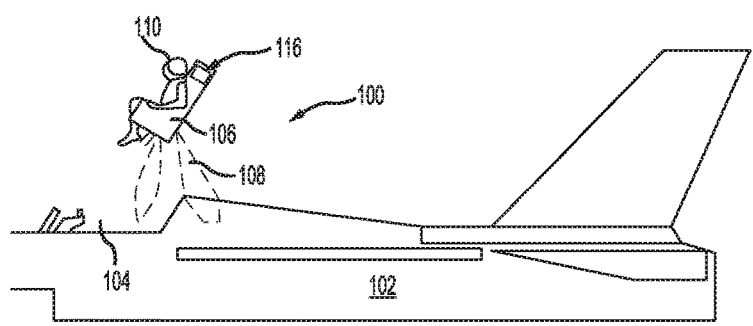
FIG. 1 illustrates an ejection seat being launched from an aircraft cockpit, in accordance with various embodiments.

In various embodiments, and with reference to FIG. 1, an aircraft ejection system 100 is shown, in accordance with various embodiments. Aircraft ejection system 100 may be installed in aircraft 102 to safely expel ejection seat 106 and an occupant 110 of ejection seat 106 from a cockpit 104 of aircraft 102. Ejection seat 106 may be urged from cockpit 104 by a propulsion system 108. Aircraft ejection system 100 may include a parachute assembly 116. In various embodiments, prior to deployment of parachute assembly 116, a portion of parachute assembly 116 may be stored within ejection seat 106.

Figure 2:
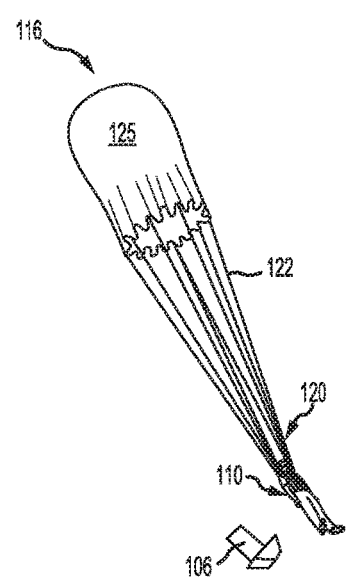
FIG. 2 illustrates a perspective view of a parachute assembly in a deployed state after separation of the occupant from the ejection seat, in accordance with various embodiments.

With reference to FIG. 2, parachute assembly 116 is illustrated in a deployed state, in accordance with various embodiments. Parachute assembly 116 may be used to increase a drag of, or otherwise decelerate, occupant 110, in response to occupant 110 being ejected from an aircraft. Parachute assembly 116 may comprise a canopy 125, suspension lines 122, and risers 120. Upon deployment of parachute assembly 116, canopy 125 may open to increase drag and decelerate occupant 110. Canopy 125 may comprise any suitable type of canopy and any suitable type of material, such as, for example, canvas, silk, nylon, aramid fiber (e.g., sold under the mark KEVLAR®), polyethylene terephthalate, and/or the like. Suspension lines 122 may be coupled to canopy 125 using any suitable attachment technique, such as, for example, through stitching. Suspension lines 122 may be configured to at least partially stabilize deployed canopy 125.

Suspension lines 122 connect canopy 125 to risers 120. Suspension lines 122 and risers 120 may comprise any suitable material. For example, suspension lines 122 and risers 120 may comprise a tubular braided material that constricts in diameter under tension, such as, for example, nylon, aramid fiber (e.g., sold under the mark KEVLAR®), and/or the like. Risers 120 may comprise bundled, woven, or sewn together suspension lines 122. Risers 120 are located at an end of suspension lines 122 opposite canopy 125. Risers 120 may be configured to attach to a harness, or other structure, configured to secure occupant 110 to risers 120.

Parachute assembly 116 may be configured to deploy upon separation of occupant 110 from ejection seat 106. Stated differently, in various embodiments, deployment of parachute assembly 116 may separate occupant 110 from ejection seat 106. As canopy 125 catches wind, occupant 110 may be rotated to orient occupant 110 in the direction of suspension line stretch. As occupant 110 is rotated in-line with the force provided by canopy 125, a rearward force may be exerted on the head and neck of occupant 110. As used herein, "rearward" refers to a direction extending from the frontside, or face, of occupant 110 to the backside, or rear, of occupant 110.

Figure 3A:
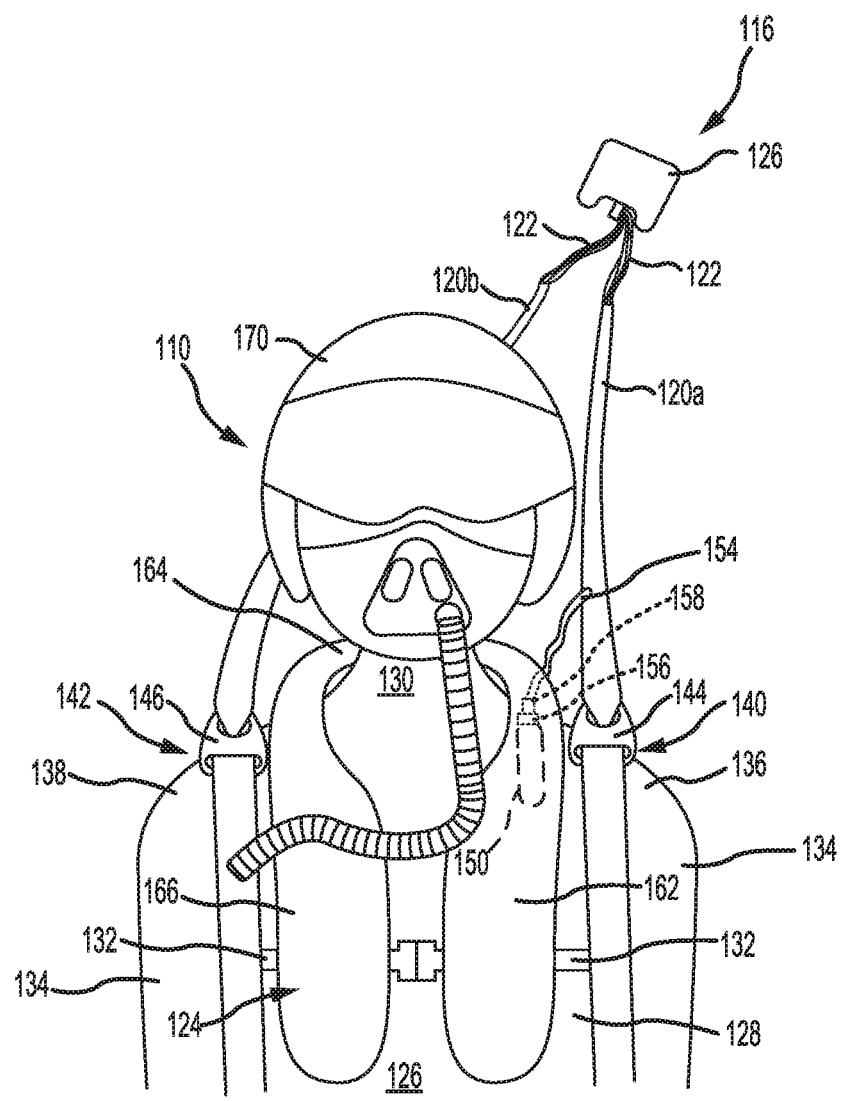
FIG. 3A illustrates a life preserver head restraint in a deflated state, in accordance with various embodiments.

In accordance with various embodiments, parachute assembly 116 may include a life preserver head restraint 124, with momentary reference to FIG. 3A. Life preserver head restraint 124 may be configured to inflate upon deployment of parachute assembly 116. Life preserver head restraint 124 may reduce or prevent reward head movement during line stretch. Additionally, in the case of a water landing, configuring life preserver head restraint 124 to inflate upon parachute deployment may keep the occupant's head out of the water should occupant 110 be unconscious or otherwise unable to inflate his/her life preserver.

With reference to FIG. 3A, a life preserver head restraint 124 is illustrated in a deflated state, in accordance with various embodiments. In various embodiments, life preserver head restraint 124 may be included on a flight suit 126 configured to be worn by occupant 110. For example, life preserver head restraint 124 may be attached via stitching, adhesive, or other suitable attachment technique to flight suit 126. In various embodiment, life preserver head restraint 124 may be located within a pocket, or volume, defined by the material of flight suit 126. In this regard, the material of flight suit 126 may cover or conceal life preserver head restraint 124 prior to inflation. Life preserver head restraint 124 extends around the collar and over a chest portion 128 of flight suit 126. In this regard, life preserver head restraint 124 is located over the chest and rearward of, or behind, the neck 130 of occupant 110. In various embodiment, life preserver head restraint 124 may include one or more circumferentially extending straps 132. Straps 132 may be positioned under the arms 134 of flight suit 126 and around the back portion 127 (with momentary reference to FIG. 3B) and chest portion 128 of flight suit 126, such that straps 132 are located between arms 134 and back and chest portions 127, 128 of flight suit 126.

Parachute assembly 116 may comprise one or more left (or first) shoulder riser(s) 120a and one or more right (or second) shoulder riser(s) 120b. Left shoulder risers 120a are attached proximate a left shoulder 136 of occupant 110 and are configured to be located over left shoulder 136 of occupant 110 upon deployment of parachute assembly 116. Right shoulder risers 120b are attached proximate a right shoulder 138 of occupant 110 and are configured to be located over right shoulder 138 of occupant 110 upon deployment of parachute assembly 116.

In various embodiments, left shoulder risers 120a may be attached to flight suit 126 at an attachment location 140. Right shoulder risers 120b may be attached to flight suit 126 at an attachment location 142. Attachment locations 140, 142 are on an end of left and right shoulder risers 120a, 120b that is opposite suspension lines 122 and canopy 125. Attachment locations 140, 142 may comprise any suitable attachment mechanism (e.g., stitching, adhesive, etc.) for securing left and right shoulder risers 120a, 120b to flight suit 126. In various embodiments, attachment location 140 may comprise a left ring 144 attached to flight suit 126. Left shoulder risers 120a may be located through left ring 144. Stated differently, left ring 144 may be located through a loop defined by left shoulder risers 120a. Attachment location 142 may comprise a right ring 146 attached to flight suit 126. Right shoulder risers 120b may be located through right ring 146. Stated differently, right ring 146 may be located through a loop defined by right shoulder risers 120b.

Life preserver head restraint 124 includes a compressed fluid source, for example, a charge tank 150. Charge tank 150 is fluidly coupled to life preserver head restraint 124. Charge tank 150 is configured to deliver gas into life preserver head restraint 124. In accordance with various embodiments, charge tank 150 delivers gas to life preserver head restraint 124 upon deployment of parachute assembly 116. In this regard, life preserver head restraint 124 is uninflated, prior to deployment of parachute assembly 116.

Figure 3B:
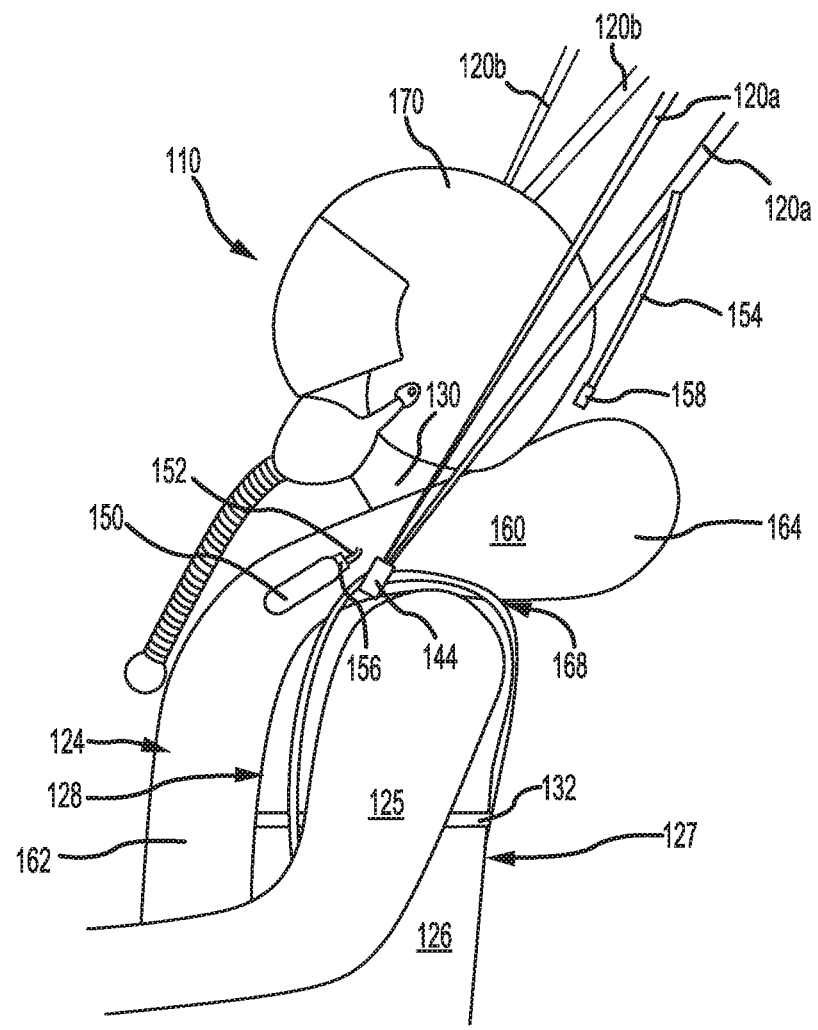
FIG. 3B illustrates a side view of a life preserver head restraint in an inflated state, in accordance with various embodiments.

Charge tank 150 may be fluidly coupled to life preserver head restraint 124 via a conduit 152, with momentary reference to FIG. 3B. In various embodiments, a lanyard 154 may be coupled between charge tank 150 and at least one of left shoulder risers 120a or right shoulder riser 120b. For example, in FIGS. 3A and 3B, lanyard 154 is coupled to a left shoulder riser 120a of parachute assembly 116. While lanyard 154 is illustrated as coupled to a left shoulder riser 120a, it is further contemplated and understood that lanyard 154 may be coupled to a right shoulder riser 120b and/or that life preserver head restraint 124 may include a second charge tank, similar to charge tank 150, with a second lanyard coupled between the second charge tank a right shoulder riser 120b.

Lanyard 154 is configured to initiate inflation of life preserver head restraint 124 in response to tension in left shoulder riser 120a. For example, upon deployment of parachute assembly 116, a tension in left shoulder risers 120a increases. The increase in tension may cause a translation of lanyard 154. The translation of lanyard 154 may actuate a valve 156 of charge tank 150 to an open position. Valve 156 may be fluidly coupled between an output of charge tank 150 and conduit 152. In various embodiments, the translation of lanyard 154 may pull a pin 158, which when removed (i.e., pulled), actuates valve 156 to the open position. Actuating valve 156 to the open position allows gas to flow from charge tank 150 to life preserver head restraint 124.

FIG. 3B illustrates life preserver head restraint 124 in an inflated state, in accordance with various embodiments. Life preserver head restraint 124 defines an inflatable volume 160. Inflatable volume 160 (i.e., life preserver head restraint 124) is located behind, or rearward of, head 170 and neck 130 of occupant 110. Inflatable volume 160 is also located over chest portion 128 of flight suit 126. Life preserver head restraint 124 may comprise a generally U-shape. In this regard, and with combined reference to FIGS. 3A and 3B, life preserver head restraint 124 may include a first portion 162 located over chest portion 128 of flight suit 126 and extending to a transverse portion 164 of life preserver head restraint 124. Transverse portion 164 of life preserver head restraint 124 is located rearward of neck 130 of occupant 110 (e.g., along a rearward collar portion 168 of flight suit 126). Life preserver head restraint 124 further includes a second portion 166 located over chest portion 128 of flight suit 126 and extending to transverse portion 164. First portion 162 may be located proximate left shoulder 136. Second portion 166 may be located proximate right shoulder 138. Transverse portion 164 connects first portion 162 and second portion 166.

In the inflated stated shown in FIG. 3B, first and second portions 162, 166 of life preserver head restraint 124 may restrict side-to-side movement of neck 130 and head 170 (i.e., motion toward left and right shoulders 136, 138), while transverse portion 164 restricts translation of neck 130 and head 170 rearward. Configuring life preserver head restraint 124 to inflate in response to deployment of parachute assembly 116, allows life preserver head restraint to limit translation of neck 130 and head 170 during separation from ejection seat 106, with momentary reference to FIG. 2, thereby decreasing a possibility for neck injury during suspension line stretch.

Figure 4A:
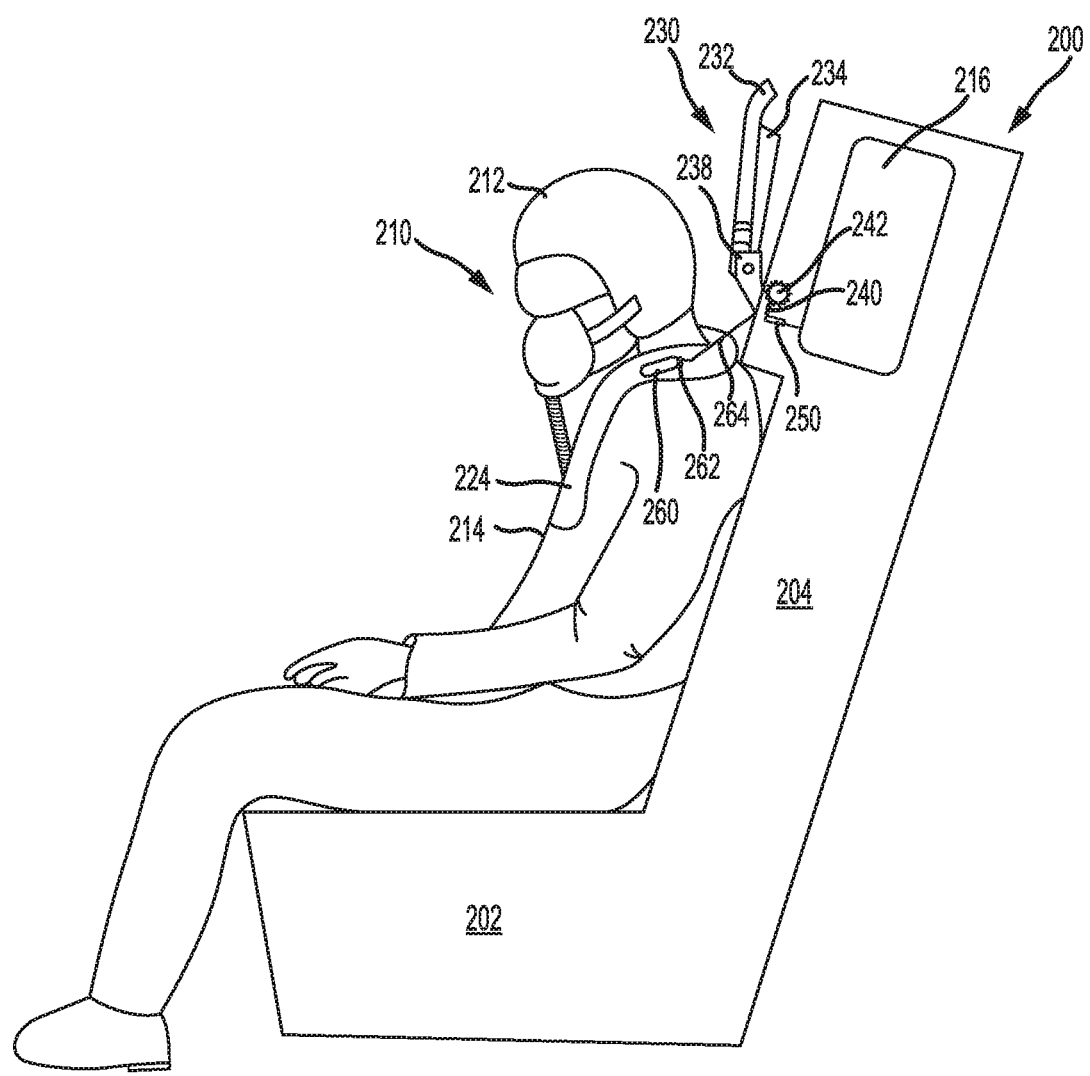
FIG. 4A illustrates an ejection seat having a head restraint system in a non-deployed position, in accordance with various embodiments.

With reference to FIG. 4A, an ejection seat 200 supporting an occupant 210 is illustrated, in accordance with various embodiments. Ejection seat 200 includes a seat pan 202 and a seat back 204. Ejection seat 200 is configured to be expelled from an aircraft cockpit, similar to ejection seat 106 in FIG. 1. Upon receipt of an eject signal (e.g., an ejection signal initiated by pilot command or an ejection signal based on an algorithm operating in one of the aircraft's computers), a propulsion system is initiated to accelerate ejection seat 200 and occupant 210 out of the aircraft. The initial acceleration acting on head 212 of occupant 210 tends to cause head 212 to tilt forward and downward (i.e., toward chest 214 of occupant 210). Subsequent exposure to the wind blast upon exiting the aircraft can cause head 212 to be jerked rearward, potentially causing injury to occupant 210.

Figure 4B:
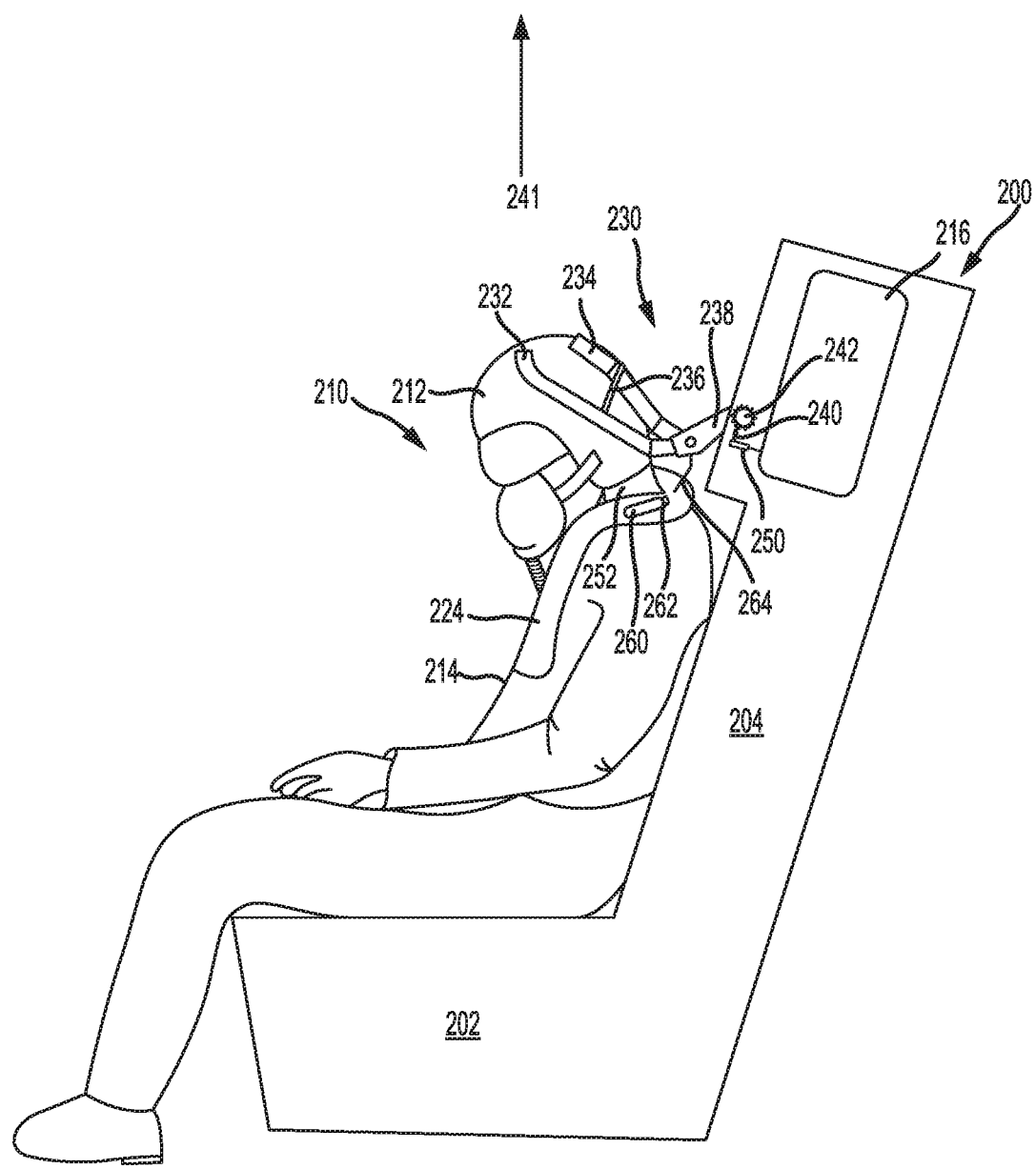
FIG. 4B illustrates the ejection seat of FIG. 4A with the head restraint system in a deployed position, in accordance with various embodiments.

Ejection seat 200 includes a head restraint system 230 that deploys from a stowed position (FIG. 4A) to a deployed position (FIG. 4B). In the deployed position, head restraint system 230 restricts rearward and side-to-side movement of head 212 to maintain head 212 in a tilted forward orientation (e.g., a chin-to-chest orientation). In various embodiments, head restraint system 230 may comprise a pair of side supports 232 (one shown) and a rear support 234. Side supports 232 and rear support 234 are pivotably attached to seat back 204. Upon receipt of an eject signal, side supports 232 and rear support 234 pivot forward (i.e., away from seat back 202 and toward head 212). In the deployed position, the side supports 232 are located over opposing sides (i.e., the left and right sides) of head 212 and restrict side-to-side movement of head 212. In the deployed position, rear support 234 contacts a rearward portion of head 212 and restricts rearward movement of head 212.

In various embodiments, a flexible strap 236 is attached between rear support 234 and side supports 232. In various embodiments, as side supports 232 pivot forward, flexible strap 236 translates rear support 234 forward. Flexible strap 236 may be formed of a lightweight synthetic fabric such as nylon, polyester, aramid fibers, or other fiber material and may be formed in an open weave net, a single strap, cord, or a plurality of straps of sufficient strength to deploy rear support 234.

Each of the side supports 232 may be attached to a strut support 238. Strut support 238 is pivotably attached to seat back 204. In various embodiments, head restraint system 230 may be configured to adapt to the occupant's size and strength. For example, the angle of side supports 232 and rear support 234 relative to seat back 204 may be determined by the translation distance of head 212 during initial expulsion of ejection seat 200 (i.e., by the downward translation of head 212 as ejection seat 200 translates in the direction of arrow 241). Stated differently, side supports 232 and rear support 234 are configured to follow, rather than force, head 212 down and forward.

Head restraint system 230 is configured to be maintained in the deployed position during expulsion of ejection seat 200. For example, in various embodiments, rotation of side supports 232 and rear support 234 may employ a pawl 240 configured to engage a series of teeth on a pivot joint 242. In this regard, as side supports 232 and rear support 234 pivot in a first direction away from seat back 204, pivot joint 242 rotates and pawl 240 engages a new tooth, thereby restricting side supports 232 and rear support 234 from pivoting in the opposite direction toward seat back 204.

In various embodiments, head restraint system 230 may be configured to retract in response to deployment of a parachute assembly 216. Parachute assembly 216 is similar to parachute assembly 116 in FIG. 2 and includes a canopy, suspensions lines, and risers similar to canopy 125, suspension lines 122, and risers 120, respectively. In accordance with various embodiments, side supports 232 and rear support 234 may retract to the stowed position in response to deployment of parachute assembly 216. In various embodiments, a release pin 250 may be attached to parachute assembly 216. Removing release pin 250 may cause side supports 232 and rear support 234 to pivot to the stowed position. For example, pulling release pin 250 may release pawl 240, or other structure(s), configured to prevent rotation of side supports 232 and rear support 234 toward seat back 204. When release pin 250 is withdrawn, side supports 232 and rear support 234 are forced to the stowed position.

Figure 4C:
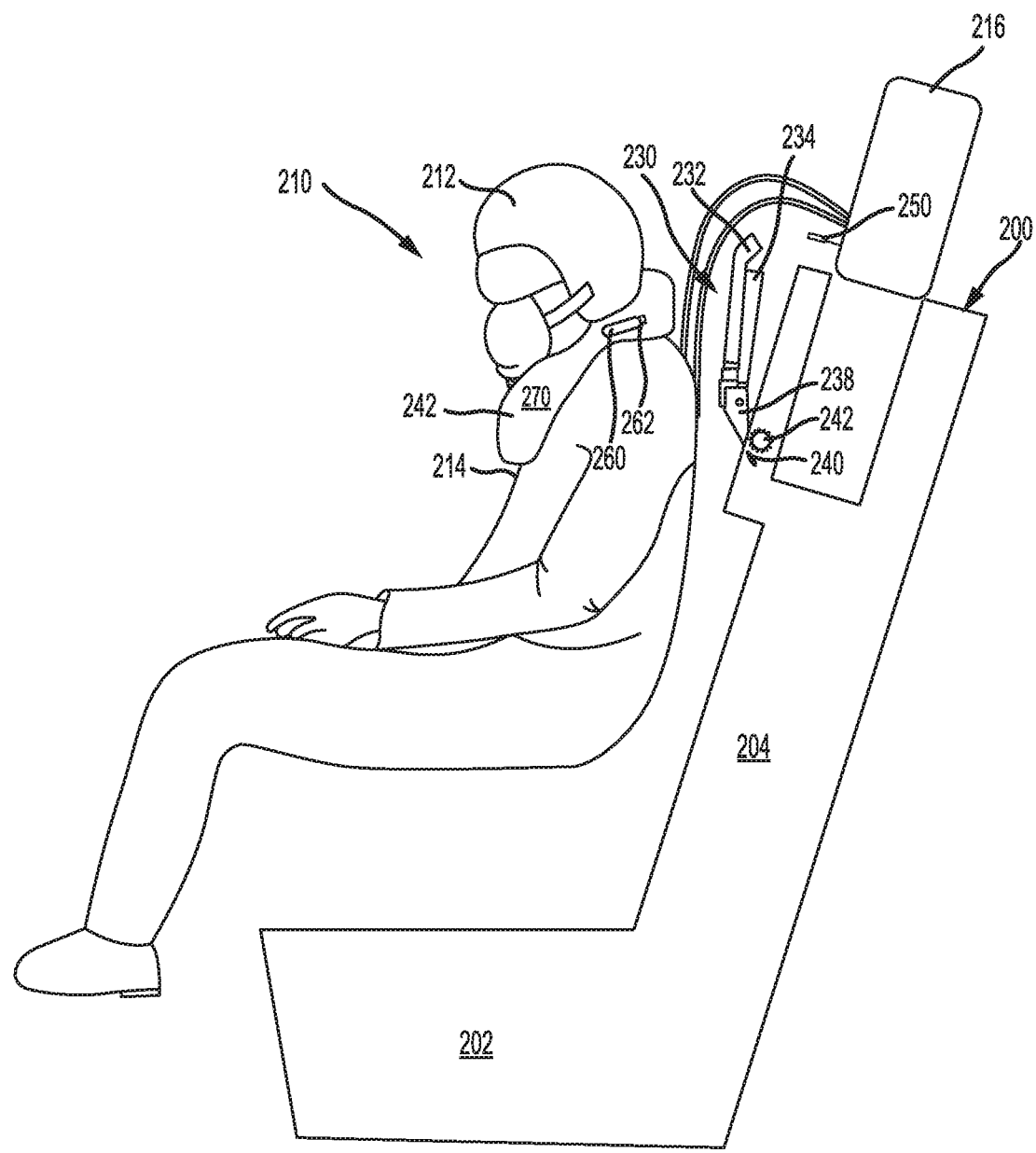
FIG. 4C illustrates the ejection seat of FIG. 4A with a life preserver head restraint in an inflated state during occupant separation, in accordance with various embodiments.

Deployment of parachute assembly 216 separates occupant 210 from ejection seat 200. As the canopy of parachute assembly 216 deploys, occupant 210 may be rotated to orient occupant 210 in the direction of suspension line stretch and a rearward force may be exerted on head 212 of occupant 210. In accordance with various embodiments, a life preserver head restraint 224 may be coupled to parachute assembly 216. The life preserver head restraint 224 may be configured to inflate upon deployment of parachute assembly 216. Stated differently, in various embodiments, life preserver head restraint 224 may inflate in response to head restraint system 230 translating from the deployed position (FIG. 4B) to the stowed position (FIG. 4C).

In various embodiments, life preserver head restraint 224 may inflate in response to head restraint system 230 translating to the deployed position. For example, life preserver head restraint 224 may inflate as side supports 232 and rear support 234 pivot away from seat back 204.

Life preserver head restraint 224 is similar to life preserver head restraint 124 in FIGS. 3A and 3B. In this regard, life preserver head restraint 224 may be included on a flight suit configured to be worn by occupant 210. Life preserver head restraint 224 extends around the collar and over the chest portion of the flight suit. Life preserver head restraint 224 is located over chest 214 and rearward of, or behind, the neck 252 of occupant 210.

Life preserver head restraint 224 includes a compressed fluid source, for example, a charge tank 260. Charge tank 260 is fluidly coupled to life preserver head restraint 224. Charge tank 260 is configured to deliver gas into life preserver head restraint 224.

In various embodiments, a lanyard 264 may be coupled between charge tank 260 and head restraint system 230. Lanyard 264 is configured to initiate inflation of life preserver head restraint 224 in response to translation of head restraint system 230. For example, deployment of side supports 232 and rear support 234 may cause translation of lanyard 264, thereby actuating a valve 262 of charge tank 260 to an open position. In various embodiments, the translation of lanyard 264 may pull a pin which, when removed (i.e., pulled), actuates valve 264 to the open position. Actuating valve 262 to the open position allows gas to flow from charge tank 260 to life preserver head restraint 224.

In various embodiments, translation of side supports 232 and rear support 234 from the deployed position to the stowed position may cause translation of lanyard 264, thereby actuating valve 262 of charge tank 260 to an open position. In various embodiments, lanyard 264 may be coupled to release pin 250, such that expulsion of parachute assembly 216 translates lanyard 264, thereby actuating valve 262 of charge tank 260 to an open position.

FIG. 4C illustrates life preserver head restraint 224 in an inflated state after separation of occupant 210 from ejection seat 200, in accordance with various embodiments. Life preserver head restraint 224 defines an inflatable volume 270, similar to inflatable volume 160 in FIG. 3B. In this regard, inflatable volume 270 (i.e., life preserver head restraint 224) may comprise a generally U-shape, similar to life preserver head restraint 124. Life preserver head restraint 224 is located behind, or rearward of, head 212 and neck 252 (FIG. 4B) of occupant 210. In the inflated stated, life preserver head restraint 224 may restrict translation of head 212 during line stretch. Configuring life preserver head restraint 224 to inflate in response to translation of head restraint system 230, allows life preserver head restraint 224 to limit translation of head 212 during separation from ejection seat 200, when head restraint system 230 is in the stowed position, thereby decreasing a possibility for neck injury during line stretch and increasing pilot safety.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A life preserver head restraint configured to inflate in response to a deployment of a parachute assembly, the life preserver head restraint comprising:

an inflatable volume; and a charge tank fluidly coupled to the inflatable volume, wherein a valve of the charge tank is configured to translate to an open position in response to the deployment of the parachute assembly.

2. The life preserver head restraint of claim 1, further comprising a flight suit coupled to the life preserver head restraint.

3. The life preserver head restraint of claim 2, wherein the inflatable volume comprises a U-shape.

4. The life preserver head restraint of claim 3, further comprising a lanyard coupled between the charge tank and the parachute assembly.

5. The life preserver head restraint of claim 4, wherein the deployment of the parachute assembly is configured to translate the lanyard.

6. The life preserver head restraint of claim 5, wherein the lanyard is coupled to the valve of the charge tank, and wherein translation of the lanyard is configured to actuate the valve to the open position.

7. The life preserver head restraint of claim 6, wherein in an inflated state the life preserver head restraint restricts head movement during suspension line stretch of the parachute assembly.

* * * * *